US010005618B2

(12) United States Patent
Fels

(10) Patent No.: US 10,005,618 B2
(45) Date of Patent: Jun. 26, 2018

(54) MATERIAL HANDLING APPARATUS

(71) Applicant: Mygrain Solutions Pty Ltd, Neridup WA (AU)

(72) Inventor: Michael Fels, Neridup WA (AU)

(73) Assignee: MYGRAIN SOLUTIONS PTY LTD, Neridup WA (AU)

(*) Notice: Subject to any disclaimer, the term of this patent is extended or adjusted under 35 U.S.C. 154(b) by 0 days. days.

(21) Appl. No.: 15/422,148

(22) Filed: Feb. 1, 2017

(65) Prior Publication Data
US 2017/0267458 A1    Sep. 21, 2017

(30) Foreign Application Priority Data
Feb. 1, 2016  (AU) ................... 2016900315

(51) Int. Cl.
*B65G 33/14*     (2006.01)
*B65G 33/00*     (2006.01)
*B65G 33/02*     (2006.01)
*B65G 65/46*     (2006.01)

(52) U.S. Cl.
CPC ............. *B65G 33/14* (2013.01); *B65G 65/46* (2013.01)

(58) Field of Classification Search
None
See application file for complete search history.

(56) References Cited

U.S. PATENT DOCUMENTS 6,261,050 B1 * 7/2001 Kuhns .................. B60P 1/42
                                                    198/671
2012/0189413 A1 * 7/2012 Richiger .............. A01F 25/20
                                                    414/310

* cited by examiner

*Primary Examiner* — Kavel Singh
(74) *Attorney, Agent, or Firm* — MH2 Technology Law Group, LLP

(57) ABSTRACT

The invention relates to material handling apparatus comprising a collecting unit having a first auger, and a discharging unit having a second auger, the collecting unit being adapted for receiving a portion of the second auger, wherein the collecting unit comprises an opening providing access to the second auger permitting material collected by the collecting unit at the first location to be delivered into the discharging unit for conveying the material via the second auger to the second location. In a particular arrangement, the collecting unit comprises a feeding chamber located adjacent the opening and spaced apart from the opening defining spacing between the opening and the feeding chamber.

25 Claims, 17 Drawing Sheets

MATERIAL HANDLING APPARATUS

CROSS-REFERENCE TO RELATED APPLICATIONS

This application claims priority to Australian Application No. 2016900315 filed 1 Feb. 2016, the entire disclosure of which is hereby incorporated in its entirety.

TECHNICAL FIELD

The present invention relates to material handling apparatus.

The invention has been devised particularly, although not necessarily solely, in relation to apparatus for conveying material such as grain from a pile on the ground into a waiting vehicle or for unloading grain from a silo bag that has been cut open to permit access of the apparatus to convey the material into the waiting vehicle

BACKGROUND ART

The following discussion of the background art is intended to facilitate an understanding of the present invention only. The discussion is not an acknowledgement or admission that any of the material referred to is or was part of the common general knowledge as at the priority date of the application.

During grain harvesting operations the freshly harvested grain is typically either stored on farm in permanent storage facilities such as permanent silos or sheds, in mobile silos prior to transport off farm, or stored in short term bulk storage such as silo bags or bunkers. Permanent and mobile infrastructure typically has a high capital cost, and farmers often require extra bulk storage with low capital cost in order to improve the efficiency of the harvest operation. Silo bags assist with harvesting logistics but they have their disadvantages.

Silo bags require periodical inspections as well as require frequent patching of holes to protect the grain from moisture and pests entering the silo bags. Also, grain may sweat when inside a silo bag thus creating a humid environment within the bag. Thus, the silo bags require continuous inspection because grain typically decomposes when contained within a humid environment.

Silo bags are relatively large bags made out of plastic material; thus, use of the silo bags creates a relative large amount of plastic waste. Also, silo bags are heavy and cumbersome to handle. Typically, several persons are required for setting up and handling the bags.

Further, filling of silo bags requires a special filling machine that can only be used for filling silo bags. And, typically, the cost of the bags is around $5/tonne of grain to be stored in the bags. Thus, the use of bags can be a relative costly exercise.

Furthermore, during a harvesting operation a relative large amount of silo bags are required for storing the freshly harvested grain. Typically, a new bag is required after having harvested 200 tonnes of grain; thus, a multitude of bags are required in a single day of harvest.

Moreover, silo bags need to be set up at clean and level sites; typically, ideal sites for setting up the silo bags are not available at the location where the grain is being harvested. Thus, the silo bags need to be set up at locations distal from the harvesting location. This requires carting the freshly harvested grain to the distal location where the silo bags are set up; this typically is a time consuming and cumbersome process.

It is against this background that the present invention has been developed.

SUMMARY OF INVENTION

In accordance with the below described aspects of the invention there are provided particular arrangements of material handling apparatus adapted for collecting grain from piles resting on a surface.

Alternatively the material handling apparatus may be used for extracting grain stored in the silo bags that have been, for example, cut to permit the material handling apparatus access to the grain for collection thereof. In a particular arrangement of the material handling apparatus in accordance with the below described aspects of the invention, the material handling apparatus comprises cutting means for cutting the silo bag as the apparatus drives along the silo bag.

Furthermore, the material handling apparatus in accordance with below described aspects of the invention comprises a drive train for operatively connecting the apparatus to the power take off (PTO) of the towing vehicle such as a tractor. The particular arrangement of drive train is being directly driven from a single PTO shaft without the need for hydraulic power for rotating parts; this is particularly advantageous because it is a simpler and more positive drive system when compared to conventional drive systems, as well as being capable of transferring higher loads which allows the use of larger augers permitting increasing the capacity of collection and delivery of the apparatus In a particular arrangement, the large capacity of the material handling apparatus in accordance with below described aspects of the invention is achieved by (1) the use of larger auger sizes—the horizontal auger (the first auger 16) flighting is 280 mm diameter, the discharge auger (the second auger 20) flighting has 380 mm diameter—and (2) due to the effect of the force feed chamber in efficiently transitioning the grain from horizontal movement to vertical movement in accordance with the below described aspects of the invention.

Further, the material handling apparatus in accordance with below described aspects of the invention comprises a particular system for adjusting lift and height of the wheels of the material handling apparatus in accordance with below described aspects of the invention.

Furthermore, the material handling apparatus in accordance with the below described aspects of the invention comprises a particular configuration of collecting unit having a base configured as a tapered leading edge which emulate the effects of a sled substantially reducing wastage, while sharing the weight of the apparatus 10 over a large surface area avoiding sinking of the apparatus into a soft surface and thus impeding collection by the horizontal auger of material that makes up the surface onto which the apparatus is mounted.

According to a first aspect of the invention there is provided a material handling apparatus for conveying material stacked at a first location to a second location, the apparatus comprising a collecting unit having a first auger, and a discharging unit having a second auger, the collecting unit being adapted for receiving a portion of the second auger, wherein the collecting unit comprises an opening providing access to the second auger permitting material collected by the collecting unit at the first location to be delivered into the discharging unit for conveying the material via the second auger to the second location.

Preferably, the collecting unit comprises a chamber for receiving the portion of the second auger, the chamber comprising the opening.

Preferably, the collecting unit comprises a support body comprising the chamber.

Preferably, the support body comprises a first face and a second face, the first face being adapted to rotatably attach the first auger.

Preferably, the second face is adapted to receive a hitch frame for releasably attaching the apparatus to a towing vehicle.

Preferably, support body comprises a base having a tapered leading edge for emulating the effect of the sled as the apparatus moves into the pile of grain for collection of the grain.

Preferably, the first face comprises the opening providing access to the chamber having the portion of the second auger.

Preferably, the collecting unit further comprises a feeding chamber located adjacent the opening.

Preferably, the feeding chamber is spaced apart from the opening defining spacing between the opening and the feeding chamber.

Preferably, the feeding chamber is adapted to receive the material and to deflect the material into the opening for delivering the material into the discharging unit.

Preferably, the opening is of triangular configuration and the feeding chamber comprises a body of triangular configuration.

Preferably, the first auger extends from one end of the support body to the opposite end of the support body.

Preferably, the first auger comprises flighting having first and second sections comprising opposite screw orientations with respect to each other.

Preferably, the first auger comprises a first section having a screw orientation that, during rotation of the first auger, delivers the material from the one end of the support body to the opening, and a second section having another screw orientation that, during rotation of the first auger, delivers the material from the opposite side of the collecting unit to the opening.

Preferably, there is an interface between the first section and the second section of the first auger, the interface being located adjacent to the opening permitting that the material conveyed by the first section and the material conveyed by the second section be delivered through the opening into the discharging unit.

Preferably, the interface comprises paddle means.

Preferably, the paddle means are adapted to deliver the material reaching the opening into the discharging unit.

Preferably, the paddle means comprises wing members extending longitudinally along the interface between the first section and the second section of the first auger.

Preferably, the wing members extend outwardly from the first auger in opposite directions with respect to each other.

Preferably, each wing member comprises a curved face.

Preferably, the paddle means are adapted to throw the material towards an inner surface of the feeding chamber for deflection of the material into the discharging unit through the opening.

Preferably, the material is thrown upward towards an inner surface of the feeding chamber Preferably, an end of the first auger is rotatably attached to the first face of the support body through a bearing assembly attached to the one end of the support body and an opposite end of the first auger is operatively attached to a second drive transmission attached to the opposite end of the support body of the collecting unit.

Preferably, the second drive transmission comprises a sprocket and chain assembly.

Preferably, the collecting unit further comprises a frame at least partially covering the first auger.

Preferably, the frame comprises at least one upper section adapted to receive material.

Preferably, the apparatus further comprises first wheels for moving the apparatus.

Preferably, there is one first wheel on each side of the support body of the collecting unit.

In an alternative arrangement, there are a pair of first wheels on each side of the support body of the collecting unit.

Preferably, the first wheels are attached to the second face of the support body and adapted to adjust the height of the support body of the collecting unit.

Preferably, each first wheel is pivotally attached to the second face of the collecting unit via a support arm and an adjustable coupling extending from the second face of the collecting unit to a particular location of the support arm.

Preferably, the support arm is attached to the second face of the support body of the collecting unit via a pivot joint.

Preferably, an end of the coupling is attached to the second wall of the collecting unit at a location above the pivot joint and another end is attached to the particular location of the support arm.

Preferably, the particular location of the support arm is a distal end of the support arm.

In an alternative arrangement, the apparatus further comprises jack wheels attached to each side of the support body to adjust the height of the support body of the collecting unit.

Preferably, there are left and right jack wheels

Preferably, the left and right jack wheels are adapted to mechanically adjust the height independently with respect to each other at each side of the collecting unit.

Preferably, the support body is adapted to be tilted for adjusting the height and angle of the first auger with respect to the ground.

Preferably, the apparatus comprises a pair of hydraulic cylinders spaced apart with respect to each other and each cylinder is located adjacent one of the sides of the collecting unit.

Preferably, an end of each cylinder is attached to the second face of collecting unit, and the other end is attached to a hitch frame of the apparatus for connecting the collecting unit to the towing vehicle.

Preferably, the apparatus is adapted to be operatively attached to drive means (power take-off; also referred to as PTO) and hydraulic fluid sources of the towing vehicle.

Preferably, the apparatus is operatively attached to the towing vehicle via a first shaft having an end attached to the PTO of the towing vehicle and another end operatively attached to transmission means for transmitting the rotational force of the PTO to the first and second augers.

Preferably, the apparatus comprises a drive train for operatively attaching the PTO to the first and second augers of the apparatus.

Preferably, the drive train comprises a PTO shaft (also referred to as drive shaft) extending from the tractor to a centre support bearing.

Preferably, The PTO shaft comprise a shear pin for overload protection.

Preferably, a first coupling shaft extends from the centre support bearing to a 90 degree gearbox and a second coupling shaft extends from the 90 degree gearbox to a 45 degree gearbox operatively connected to transmit the rotational force of the PTO to the base of the second auger.

Preferably, a first sprocket attached to the second coupling shaft having a chain transferring the rotational force of the PTO to a second sprocket operatively attached to a third coupling shaft that transfers the rotational force of the PTO to one of the ends of the first auger via a sprocket and chain assembly attached to the third coupling shaft.

In an alternative arrangement, transmission means comprises a first transmission assembly comprising a transmission for attachment of the first shaft, the transmission assembly comprising (1) a second shaft operatively attached to the second auger for operating the discharging unit and (2) a first drive transmission for transmitting the rotational movement of the PTO to a third shaft for rotating of the first auger to operate the collecting unit.

Preferably, the third shaft is operatively attached to the second drive transmission located at the opposite end of the support body for transferring the rotational movement of the PTO to the first auger.

Preferably, the discharging unit of the apparatus for delivering the collected grain to the second location (for example, a waiting vehicle), the discharging unit comprising first and second sections, the second section being pivotally attached to the first section permitting to selective displacement of the discharging unit between a collapsed condition and an erected condition.

Preferably, the first section and the second section comprises respectively a first tubular body and a second tubular body, each tubular body adapted to receive a section of the second auger, the sections being rotatably attached within the tubular bodies.

Preferably, the first tubular body extends diagonally from the support body of the collecting unit at a location such that a portion of the second auger may be accessed through the opening and an end of the second auger be operatively connected to the second shaft for receiving the rotational movement provided by the PTO of the towing vehicle.

Preferably, the tubular body of the second section of the discharging unit is pivotally attached to the tubular body via hinge means.

Preferably, the discharging unit further comprises a third hydraulic cylinder for selectively displacing the discharging unit between a collapsed condition and an extended condition.

Preferably, the first and second sections of the second auger are adapted to be operatively connected to each other via coupling means.

Preferably, the coupling means comprise a female portion and a male portion adapted to be received into the female portion during coupling of the first and second sections of the second auger.

According to a second aspect of the invention there is provided a collecting unit having a first auger, the collecting unit being adapted to receive a discharging unit having a second auger, wherein the collecting unit comprises an opening providing access to the second auger permitting material collected by the collecting unit at a first location to be delivered into the discharging unit for conveying the material via the second auger to a second location.

Preferably, the collecting unit comprises a chamber for receiving the portion of the auger, the chamber comprising the opening.

Preferably, the collecting unit comprises a support body comprising the chamber.

Preferably, the support body comprises a first face and a second face, the first face being adapted to rotatably attach the first auger.

Preferably, the second face is adapted to receive a hitch frame for releasably attaching the apparatus to a towing vehicle.

Preferably, support body comprises a base having a tapered leading edge for emulating the effect of the sled as the apparatus moves into the pile of grain for collection of the grain.

Preferably, the first face comprises the opening providing access to the chamber having the portion of the second auger.

Preferably, the collecting unit further comprises a feeding chamber located adjacent the opening.

Preferably, the feeding chamber is spaced apart from the opening defining spacing between the opening and the feeding chamber.

Preferably, the feeding chamber is adapted to receive the material and to deflect the material into the opening for delivering the material into the discharging unit.

Preferably, the opening is of triangular configuration and the feeding chamber comprises a body of triangular configuration.

Preferably, the first auger extends from one end of the support body to the opposite end of the support body.

Preferably, the first auger comprises flighting having first and second sections comprising opposite screw orientations with respect to each other.

Preferably, the first auger comprises a first section having a screw orientation that, during rotation of the first auger, delivers the material from the one end of the support body to the opening, and a second section having another screw orientation that, during rotation of the first auger, delivers the material from the opposite side of the collecting unit to the opening.

Preferably, there is an interface between the first section and the second section of the first auger, the interface being located adjacent to the opening permitting that the material conveyed by the first section and the material conveyed by the second section be delivered through the opening into the discharging unit.

Preferably, the interface comprises paddle means.

Preferably, the paddle means are adapted to deliver the material reaching the opening into the discharging unit.

Preferably, the paddle means comprises wing members extending longitudinally along the interface between the first section and the second section of the first auger.

Preferably, the wing members extend outwardly from the first auger in opposite directions with respect to each other.

Preferably, each wing member comprises a curved face.

Preferably, the paddle means are adapted to throw the material towards an inner surface of the feeding chamber for deflection of the material into the discharging unit through the opening.

Preferably, the material is thrown upward towards an inner surface of the feeding chamber Preferably, an end of the first auger is rotatably attached to the first face of the support body through a bearing assembly attached to the one end of the support body and an opposite end of the first auger is operatively attached to a second drive transmission attached to the opposite end of the support body of the collecting unit.

Preferably, the second drive transmission comprises a sprocket and chain assembly.

Preferably, the collecting unit further comprises a frame at least partially covering the first auger.

Preferably, the frame comprises at least one upper section adapted to receive material.

In a particular arrangement of the apparatus may comprise cutting means for cutting silo bags containing grain to allow access of the apparatus to the grain stored within the silo bag.

Preferably, the cutting means are adapted and located at particular locations of the apparatus permitting that as the apparatus travels along the silo bag, the silo bag is cut and the apparatus may collect the grain located within the silo bag.

Preferably, the cutting means are attached to the collecting unit.

BRIEF DESCRIPTION OF THE DRAWINGS

Further features of the present invention are more fully described in the following description of a non-limiting embodiment thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENT(S)

FIGS. 1 to 21 depict a particular arrangement of a material handling apparatus 10 in accordance with a first embodiment of the invention. FIGS. 22 to 32 depict a particular arrangement of a material handling apparatus 10 in accordance with a second embodiment of the invention.

The apparatus 10 is particularly useful for conveying into a waiting vehicle particulate material (such as grain) that is stacked on the ground or floor of a bunker. The apparatus permits stacking of freshly harvested grain onto the ground instead than storing it into silo bags. Alternatively, the apparatus 10 may be used for collecting grain form a silo bag that, for example, have been cut open for providing access to the grain for collection by the apparatus 10.

Figure 1:
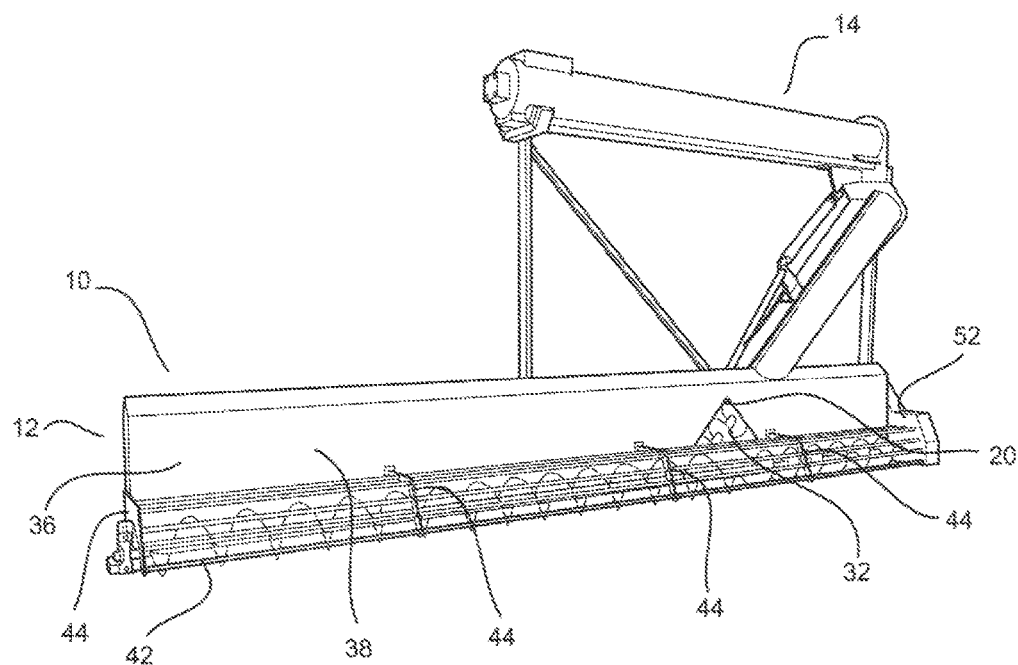
FIG. 1 is a perspective view of the material handling apparatus in accordance with a first embodiment of the invention.

As shown in FIG. 1, the apparatus 10 comprises a collecting unit 12 and a discharging unit 14. The collecting unit 12 and the discharging unit 14 are operatively connected to permit transfer of the material collected by the collecting unit 12 to the discharging unit 14 for discharging the material into, for example, a tray of a waiting vehicle 34.

Figure 2:
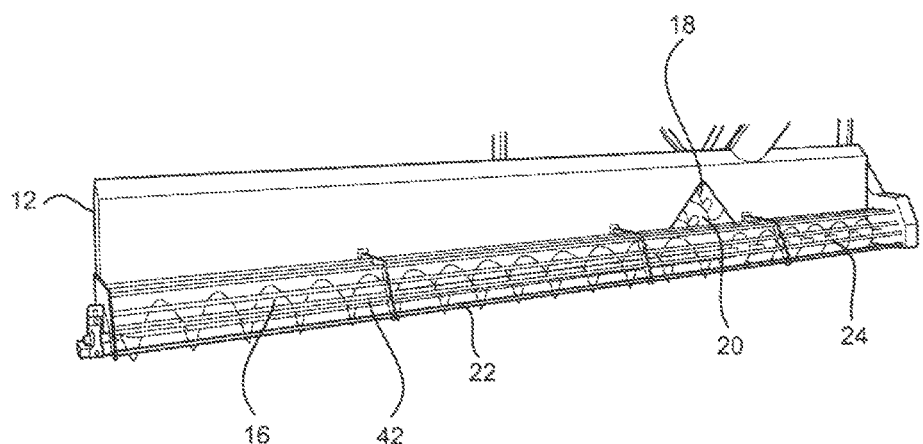
FIG. 2 is a perspective view of the collecting unit of the material handling apparatus shown in FIG. 1.

Referring to FIG. 2, the collecting unit 12 comprises a first auger 16 for collecting the material and conveying the material into a chamber 18 of the collecting unit 12 for delivery to the discharging unit 14. The discharging unit 14 comprises a second auger 20 for conveying the material delivered by the first auger 16 to the tray of the vehicle.

As will be described at a later stage, the first and second augers 16 and 20 are operatively connected to a power take-off (PTO) of, for example, a tractor that moves the apparatus 10 over the stacked material. Operatively connecting the first and second augers 16 and 20 to the PTO permits rotating the augers 16 and 20 to convey the material from the ground to the waiting vehicle.

The chamber 18 is located at a particular location between the right side and the left side of the collecting unit 12 (when facing the front face 40 of the support body 38). As will be described below, the first auger 16 is adapted to deliver the material to the chamber 18.

The particular arrangement of the first auger 16 shown in the figures comprises flighting having two sections comprising opposite screw orientation with respect to each other. In particular, a first section 22 of the first auger 16 comprises a particular screw orientation such that during rotation of the auger 16, the material is delivered from the left side of the collecting unit to the chamber 18, and a second section 24 comprises a particular screw orientation such that during rotation of the auger 16, the material is delivered from the right side of the collecting unit to the chamber 18.

The interface between the first section 22 and the second section 24 of the auger 16 is located adjacent to the chamber 18. The interface comprises paddle means 26 permitting that the material conveyed by the first section and the material conveyed by the second section 24 be delivered to the chamber 18 for transfer into the discharging unit 14.

Figure 3:
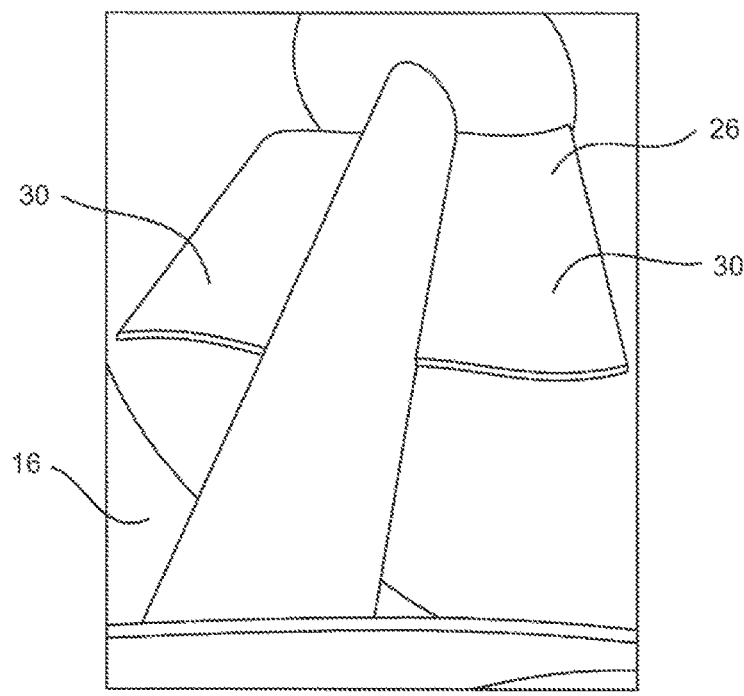
FIG. 3 is a side perspective view of a paddle assembly of the collecting unit shown in FIG. 2.
Figure 4:
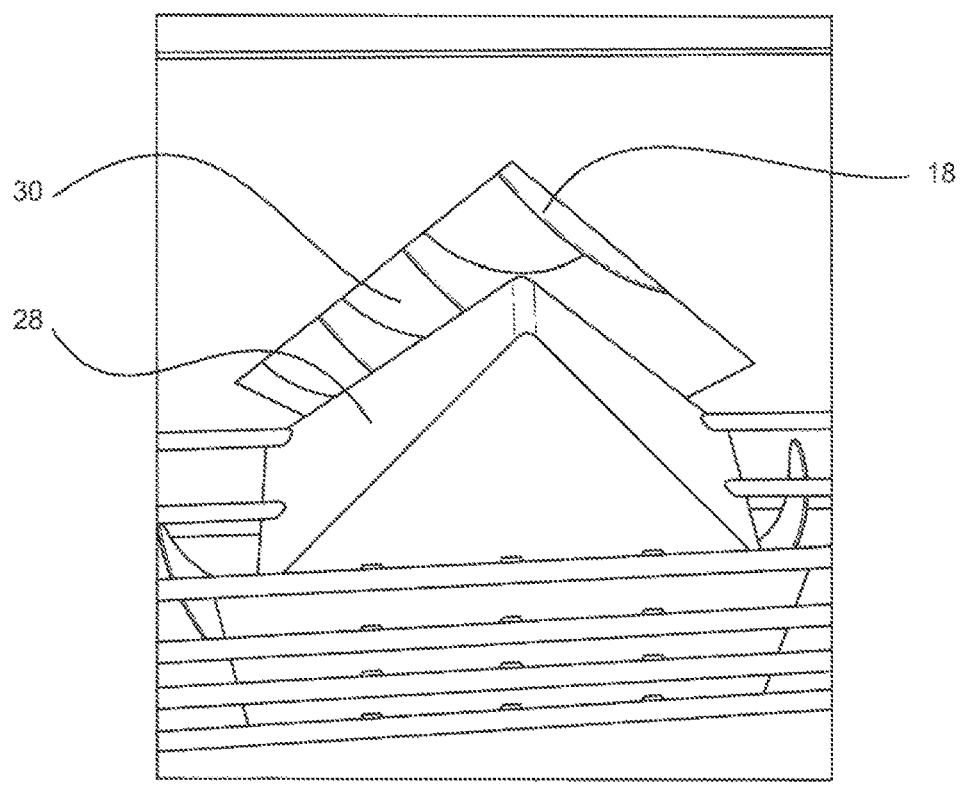
FIG. 4 is a top front perspective view of a feed chamber of the collecting unit shown in FIG. 2.
Figure 5:
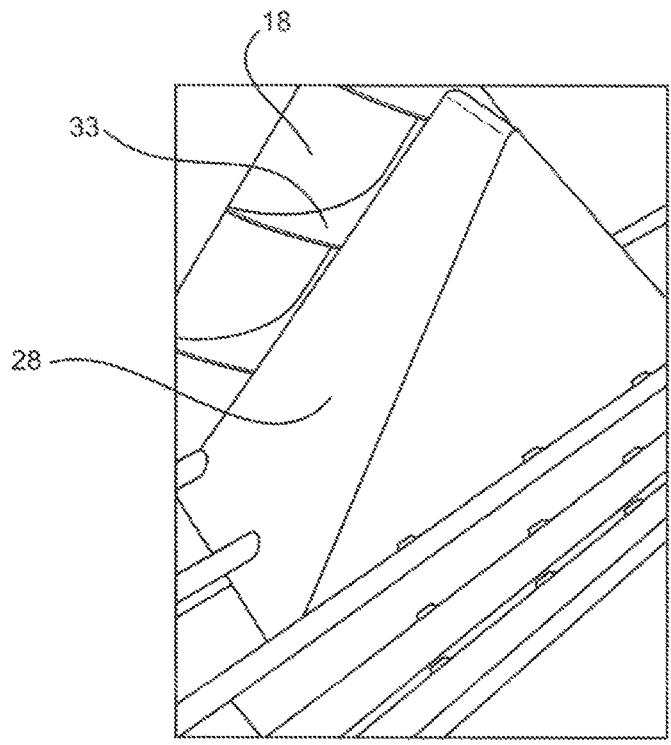
FIG. 5 is a left side perspective view of the feed chamber shown in FIG. 4.
Figure 6:
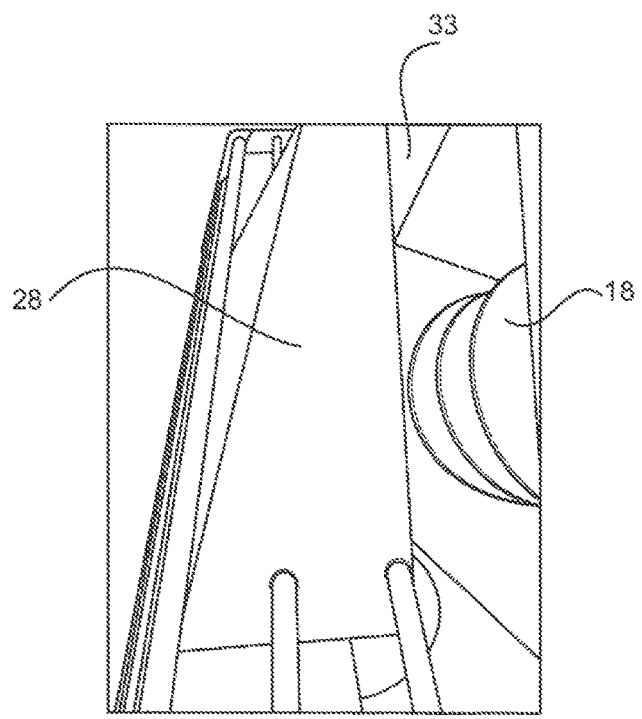
FIG. 6 is a right side perspective view of the feed chamber shown in FIG. 4.

Transfer of the material collected by the auger 16 to the discharging unit 14 is accomplished via the paddle means 26 and by a feeding chamber 28. FIG. 3 depicts the paddle means 26; FIG. 4 depicts the feeding chamber 28.

Referring to FIG. 3, the paddles means 26 permits conveying the material that has been delivered to the chamber 18 into the discharging unit 14; in particular, the paddle means 26 are configured to deliver the material reaching the chamber 18 into the discharging unit 12. As shown in FIG. 3, the paddle means 26 comprises wing members 30 extending longitudinally along the interface between the first section 22 and the second section 24 of the auger 16.

Further, the wing members 30 extend outward from the auger 16 in opposite directions with respect to each other; and, each wing member 30 comprises a curved face to allow scooping of the material to be conveyed to the discharging unit 14. This particular configuration of wing members 30 permits throwing the material reaching the chamber 18 rearwards towards the feeding chamber 28 for deflection into the discharging unit 14.

Referring now to FIG. 4, the feeding chamber 28 is mounted adjacent the chamber 18 and is substantially located above the paddles means 26. The feeding chamber 28 is adapted to receive the material that is being thrown rearwardly by the paddle means 26 and to deflect the material into the discharging unit 14.

In the particular arrangement shown in the figures, the chamber 18 comprises an opening 32 having a triangular section and the feeding chamber 28 comprises a triangular body located adjacent the triangular opening 32 of the chamber 18.

In the particular arrangement shown in the figures, the feeding chamber 28 is spaced apart from the chamber 18 defining a spacing 33. This can be best seen in FIGS. 5 and 6.

The fact that the feeding chamber 28 is spaced apart from the chamber 18 is particularly advantageous to avoid clogging up the discharging unit 14; this is because any excess material may spill out through the spacing 33. For example, if during operation of the apparatus 10 the amount of material supplied by the collecting unit 12 exceeds the amount of material that the discharging unit 14 can deliver to the tray of the waiting vehicle, the spacing 33 permits exit of any surplus material that may not be processed by the discharging unit 14. Typically, excess material may be conveyed to the discharging unit if the collecting unit 10 is pushed relatively fast into the stack of material to be collected by the collecting unit 10.

Figure 7:
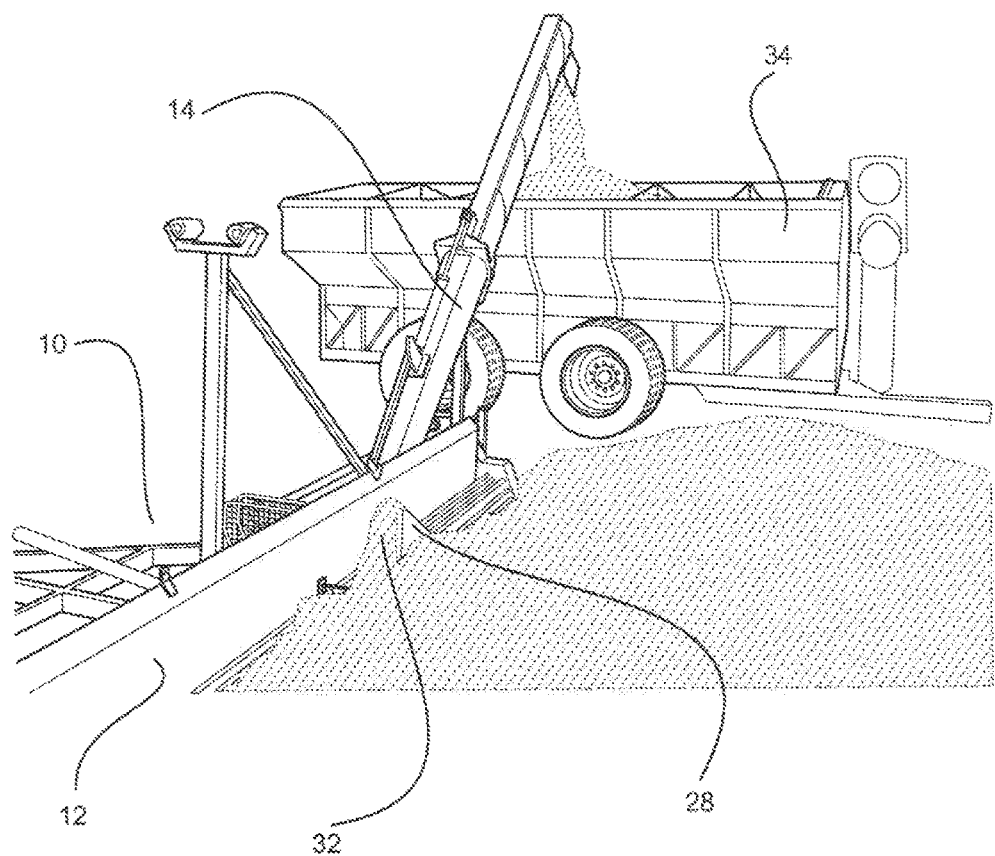
FIG. 7 is a side view of the material handling apparatus shown in FIG. 1 in operation.

FIG. 7 shows the apparatus 10 in use. In the particular instance shown in FIG. 7 the amount of material provided by the collecting unit 12 exceeds the amount of material that the discharging unit 14 can deliver to the tray 34. As can be seen in FIG. 7, any surplus material not processed by the discharging unit 14 spills out through the spacing 33. The fact that the surplus material spills through spacing 33 avoids the discharging unit 14 to get clogged up with excess material avoiding damage to the apparatus 10.

Referring now to FIGS. 8 to 12. FIGS. 8 to 12 are views depicting the collecting unit 12.

Figure 8:
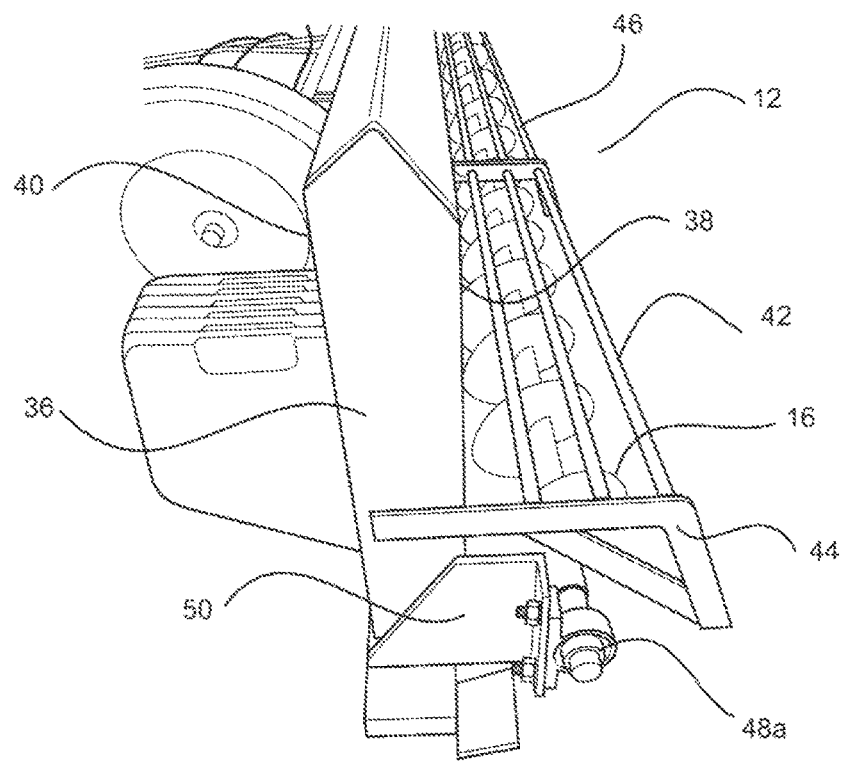
FIG. 8 is a side perspective view of the collecting unit shown in FIG. 1.
Figure 9:
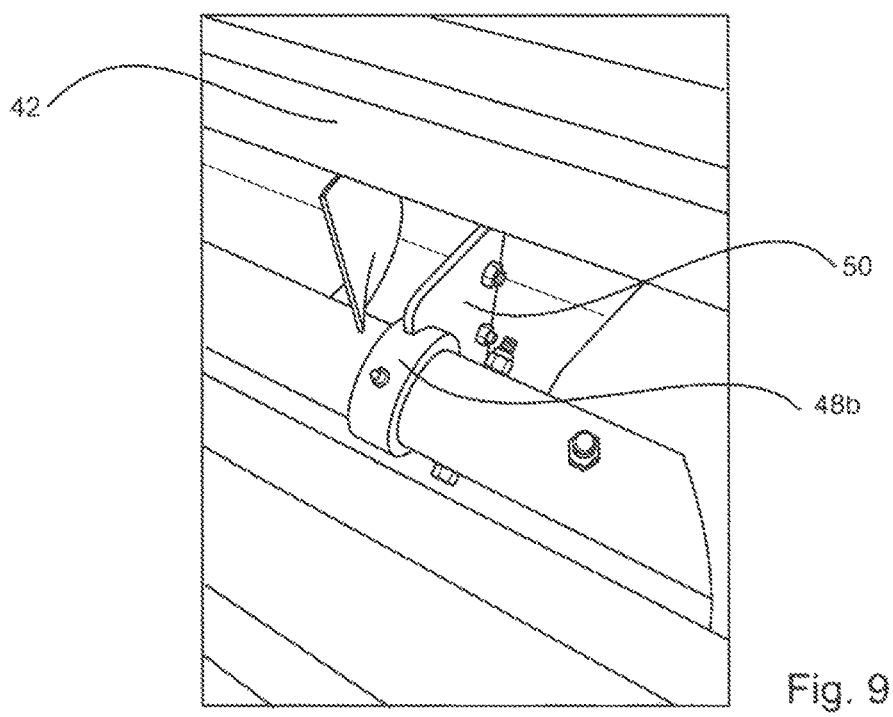
FIG. 9 is a top perspective view of a bearing assembly of the collecting unit shown in FIG. 2.

As shown in FIG. 8, the collecting unit 12 comprises a support body 36. The support body 36 comprises a front face 38 and a rear face 40. The front face 38 is configured for attachment of the first auger 16 and the feeding chamber 28 as well as a frame 42.

The front face also comprises the opening 32 allowing access to the discharging unit 14 for delivery of the material collected by the collecting unit 12. The frame 42 extends outwardly from the front face 38.

In the particular arrangement shown in the figures, the frame 42 comprises a plurality of brackets 44 arranged in a spaced apart relationship with respect to each other along the length of the front face of the support body 36. One end of the frame 42 is attached to the bracket 44a located at the left end of the support body 36; the opposite side of the frame 42 is attached to a second drive transmission 52 located at the right end side of the support body 36.

A plurality of bars 46 extend between each pair of brackets 44 and are arranged in a spaced apart relationship with respect to each other along the sides of the brackets 44 defining a cage-like structure that covers the first auger 16. The frame 42 impedes tools and personnel from falling onto the first auger 16. The fact that the frame 42 is configured as a cage-like structure covering the first auger 16 (thus, providing at least one upper section adapted to receive material) permits the excess material spilling out of the spacing 33 to return onto first auger 16 for delivery at a later stage to the discharging unit 14—see FIG. 7.

The frame 42 permits attachment of the feeding chamber 28 as can be, for example, seen in FIG. 4.

The support body 36 is adapted to be rotatably attached to the first auger 16. For this, a plurality of bearing assemblies 48 are attached to the front face 38. In particular, there is a bearing assembly 48a at one end (the left hand side end) of the support body 36 (see FIG. 8) and a plurality of bearing assemblies 48b (see FIG. 9) arranged in a spaced apart relationship with respect to each other along the length of the front face of the support body 36.

The bearing assembly 48a located at the left end of the collecting unit 12 is adapted to receive one end of the first auger 16 (see FIG. 8). The opposite end of the first auger 16 is attached to the other end of the collecting unit 12; in particular, the opposite end of the support body 36 (the right hand side end) is adapted to receive the other end of the first auger 16. As shown in FIG. 1, the right end of the support body 36 comprises the second drive transmission 52 for operatively attaching the opposite end of the first auger 16 to a power take off of the towing vehicle for rotating of the first auger 16.

Each bearing assembly 48 is attached to brackets 50 locating each bearing assembly 48 spaced apart from the front face 38.

Furthermore, the apparatus 10 comprises a plurality of wheels 54 permitting movement of the apparatus 10. The wheels 54 (also referred to as first wheels) are pivotally attached to the rear face 50 of the support body 36. The fact that the wheels 54 are pivotally attached to the rear face 40 permits adjusting the height of the support body 36 with respect to the ground on which the apparatus 10 moves. Adjustment of the height of the support body is conducted through a first hydraulic cylinder 58—see FIG. 12. One end of the first cylinder 58 is pivotally attached to the rear face 40 and the other end of the first cylinder 58 is attached to an arm member 60 to which the wheel 54 is attached. Selective displacement of the first hydraulic cylinder 58 between a contracted condition and an extended condition permits adjusting the height of the support body 36. The wheels 54 are attached to each other via an axel 62 rotatably attached to a hitch frame 64.

In an arrangement, there is one first wheel 54 on each side of the support body 36 of the collecting unit 12. In an alternative arrangement, there are a pair of first wheels on each side of the support body of the collecting unit 12.

Figure 10:
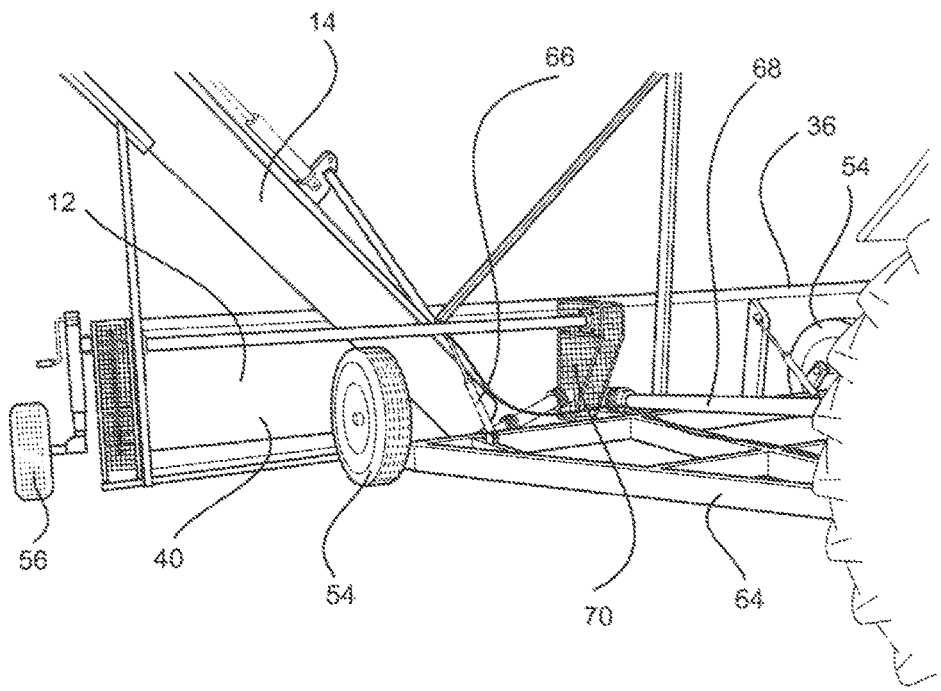
FIG. 10 is a partial rear view of the material handling apparatus shown in FIG. 1 operatively connected to a tractor.

Further, a particular arrangement of the apparatus 10 comprises jack wheels 56 attached to each side of the support body 36. The jack wheels 56 also permit adjusting the height of the support body 36 with respect to the ground. FIG. 10 shows the particular arrangement of the apparatus 10 incorporating the jack wheels 56.

Figure 13:
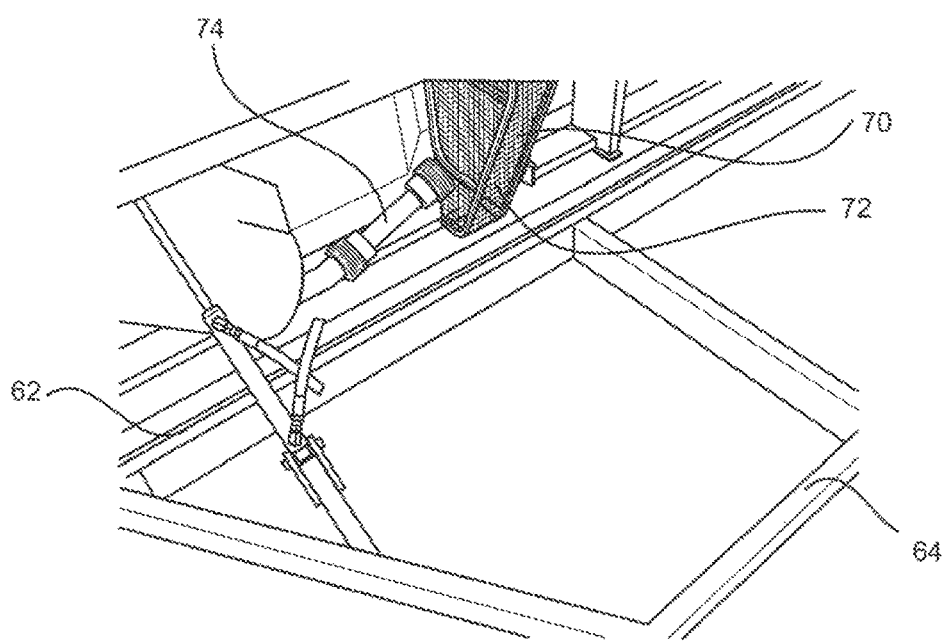
FIG. 13 is a partial top perspective view of the left hand side of the hitch frame of the material handling apparatus shown in FIG. 1.

Furthermore, the support body 36 is adapted to be tilted for adjusting the height of the first auger 16 with respect to the ground. For this, the support body 36 is pivotally attached to the hitch frame 64 and to a second hydraulic cylinder 66 as shown in FIG. 13. One end of the second cylinder 66 is pivotally attached to the rear face 40 of the support body 36 and the other end of the second cylinder 66 is attached to the hitch frame 64. Selective displacement of the second hydraulic cylinder 66 between a contracted condition and an extended condition permits tilting of the support body 36.

Figure 11:
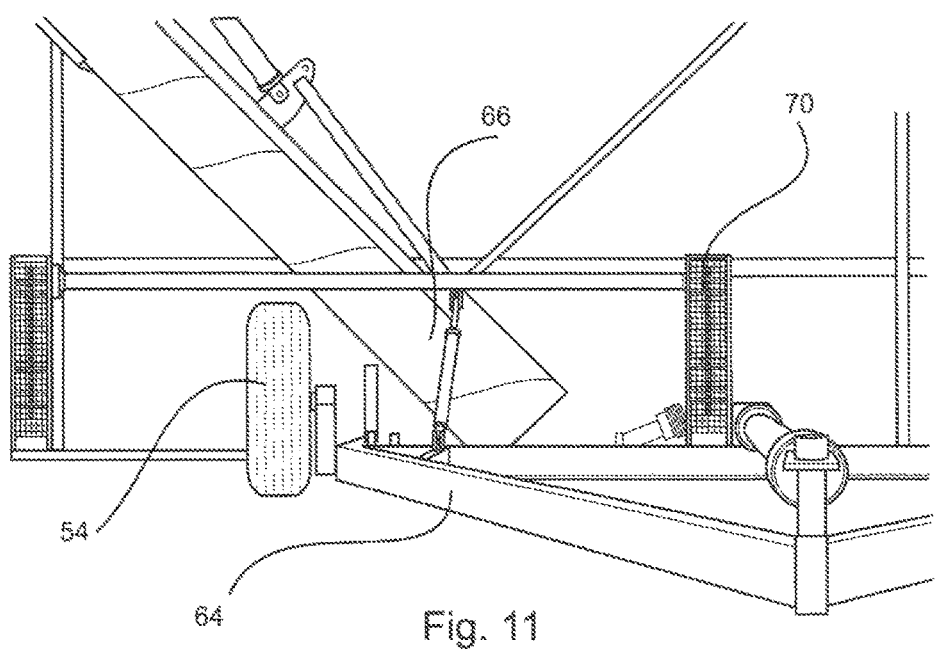
FIG. 11 is a partial rear view of the material handling apparatus shown in FIG. 1.
Figure 12:
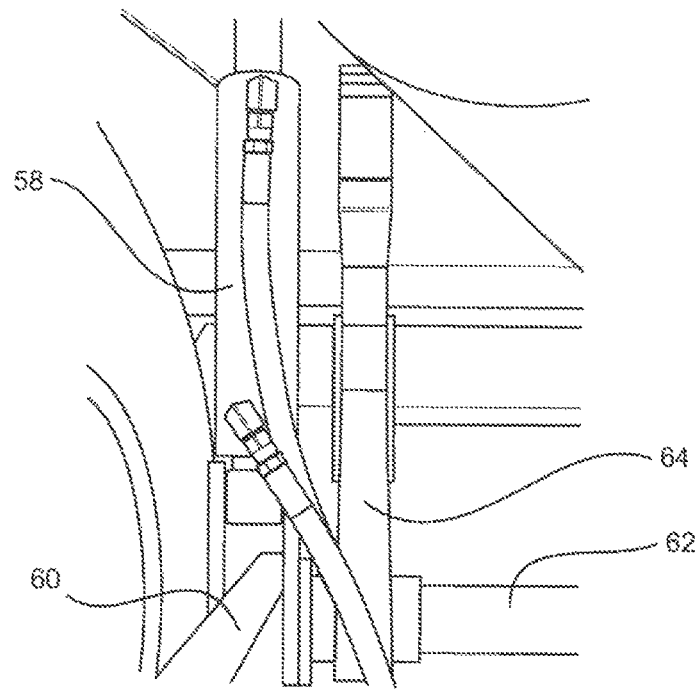
FIG. 12 is a perspective view of the hydraulic system for operating a height wheel of the material handling apparatus shown in FIG. 1.

The support body 36 may be attached to a towing vehicle such as a tractor to permit displacement of the apparatus 10. For this the apparatus 10 comprises a hitch frame 64. FIGS. 10 and 11 show the hitch frame 64 attached to the rear face 40 of the support body 36.

Moreover, the apparatus 10 is adapted to be operatively attached to drive means (also referred to as PTO) and hydraulic fluid sources of the towing vehicle. The PTO permits rotation of the first and second auger 16 and 20. The hydraulic fluid sources permit operation of the hydraulic cylinders 58 and 66.

As shown in FIG. 10, the apparatus 10 is operatively attached to the towing vehicle via a first shaft 68 having an end attached to the PTO of the towing vehicle and another end operatively attached to transmission means for transmitting the rotational force of the PTO to the first and second augers 16 and 18.

Referring now to FIGS. 13 to 16. FIGS. 13 to 16 show the transmission means.

Figure 14:
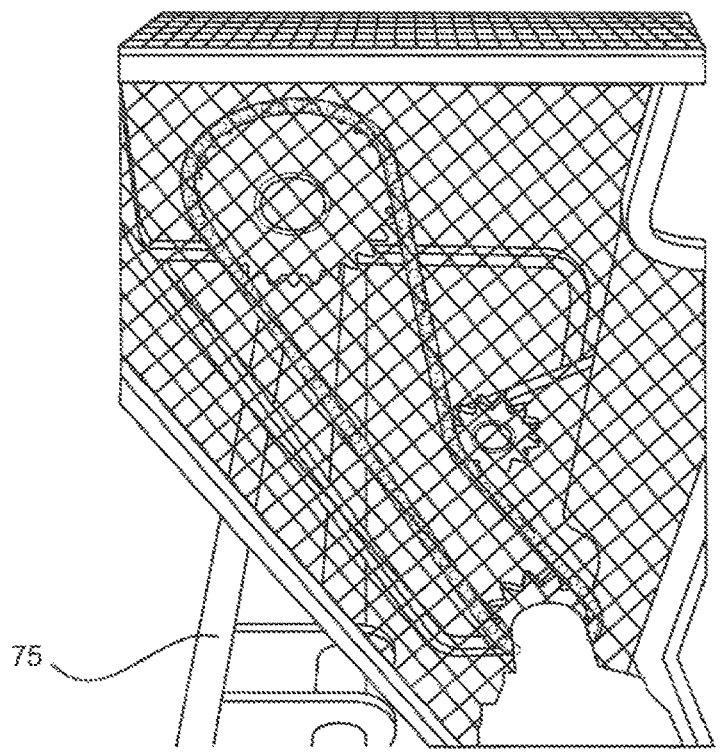
FIG. 14 is a side view of a first drive transmission of the material handling apparatus shown in FIG. 1.
Figure 15:
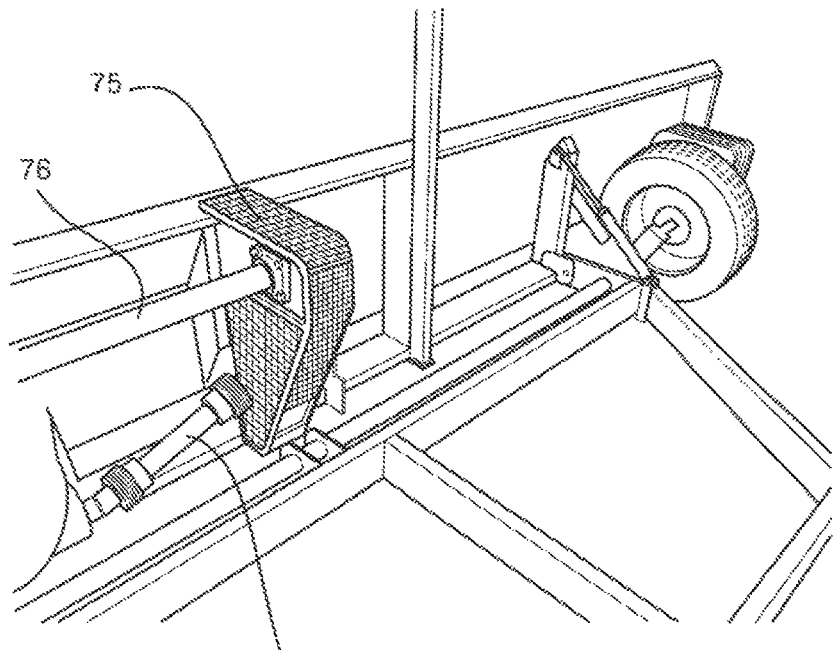
FIG. 15 is a partial top perspective view of a side of the hitch frame of the material handling apparatus shown in FIG. 1.

In particular, FIGS. 13 to 15 show a first transmission assembly 70. The transmission assembly 70 comprises a transmission 72 for attachment of the first shaft 68. The transmission 72 transfers the rotational movement (provided by the PTO of the towing vehicle) to the first and second auger 16 and 20. For this the transmission assembly 70 comprises (1) a second shaft 74 operatively attached to the second auger 20 for operating the discharging unit 14 and (2) a first drive transmission 75 that transmit the rotational movement of the PTO to a third shaft 76 for rotating of the first auger 16 to operate the collecting unit 12. In the particular arrangement shown in the figures, the first drive transmission 75 comprises a sprocket and chain assembly.

Figure 16:
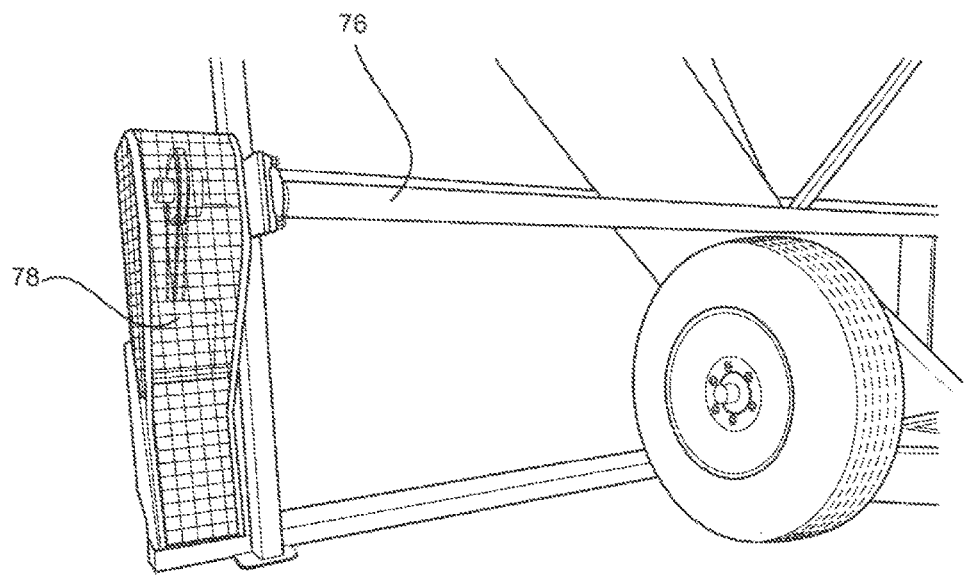
FIG. 16 is a rear view of the left hand side of the collecting unit of the material handling apparatus shown in FIG. 1.

As shown in FIG. 15, the second shaft 74 is operatively attached to one end of the second auger 20 contained within the discharging unit 14. As shown in FIG. 16, the third shaft 76 is operatively attached to a second drive transmission 78 located at one end of the support body 36 for transferring the rotational movement to the first auger 16. In the particular arrangement shown in the figures, the second drive transmission 78 comprises a sprocket and chain assembly 78.

Referring now to FIGS. 17 to 21.

As mentioned before, the apparatus 10 comprises a discharging unit 14 for receiving the material collected by the collecting unit 12 and for delivering the material to, for example, a tray of a waiting vehicle.

Figure 17:
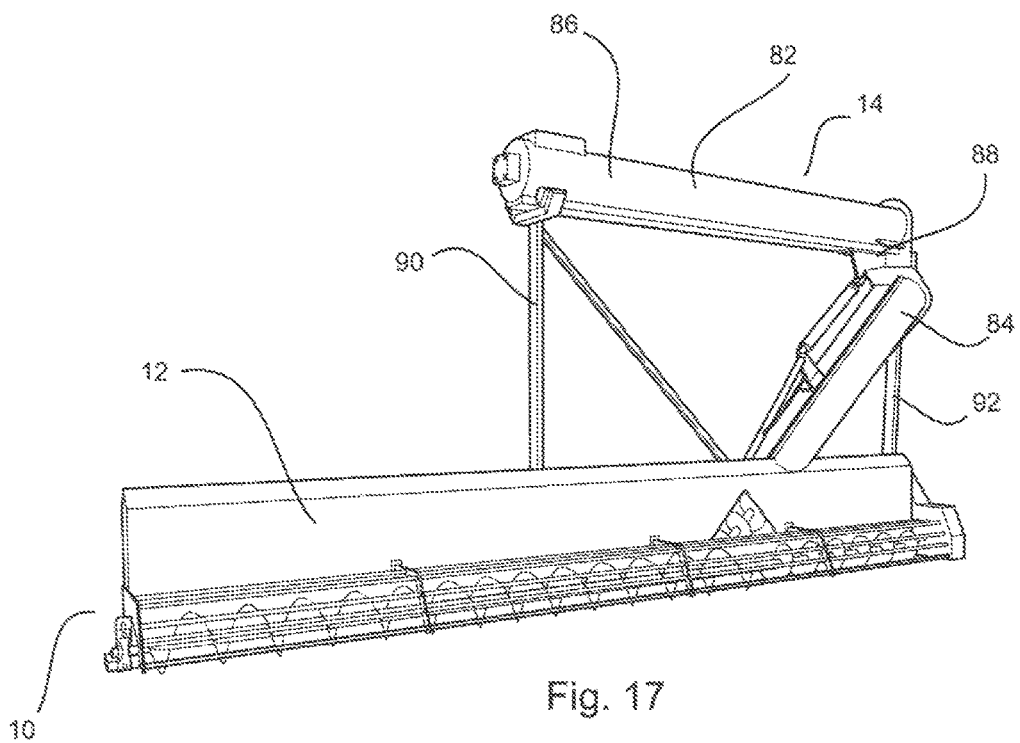
FIG. 17 is a perspective view of the discharge unit of the material handling apparatus shown in FIG. 1.

FIG. 17 shows the discharging unit 14. The particular arrangement of the discharging unit 14 shown in FIG. 17 comprises first and second sections 80 and 82. The second section 82 is pivotally attached to the first section 80 permitting selective displacement of the discharging unit 14 between a collapsed condition and an extended condition. In the collapsed condition, the apparatus 10 may be transported and stored.

The first section 80 as well as the second section 82 of the discharging unit 14 comprises a tubular body 84 and 86 adapted to receive, respectively, a first section and a second section of the second auger 20 in such a manner that the first and second sections of the auger 20 may rotate within the tubular bodies 84 and 86.

The apparatus 10 comprises a support means 90 having an end attached to the support body 36 and an opposite end separated from the support body 36 and configured as a cradle to receive the second tubular body 86 of the discharge unit 14. The support means 90 support the tubular body 86 when the discharging unit 14 is located in the collapsed condition as shown in FIG. 17. Further, a support means 92 extend from the support body 36 towards the first section 80 of the discharging unit 14 for supporting the first tubular body 84.

As shown in FIG. 17, the tubular body 84 of the first section 80 extends diagonally from the support body 36 of the collecting unit 10 at a particular location of the support body 36. The particular location where tubular body 84 extends from the support body 36 is such that (1) a portion of the first section of the auger 20 into the support body 36 such that the portion may be accessed through the opening 32 and (2) an end of the auger 20 may be operatively connected to the second shaft 74 (see FIG. 13) for receiving the rotational movement provided by the PTO of the towing vehicle.

Figure 18:
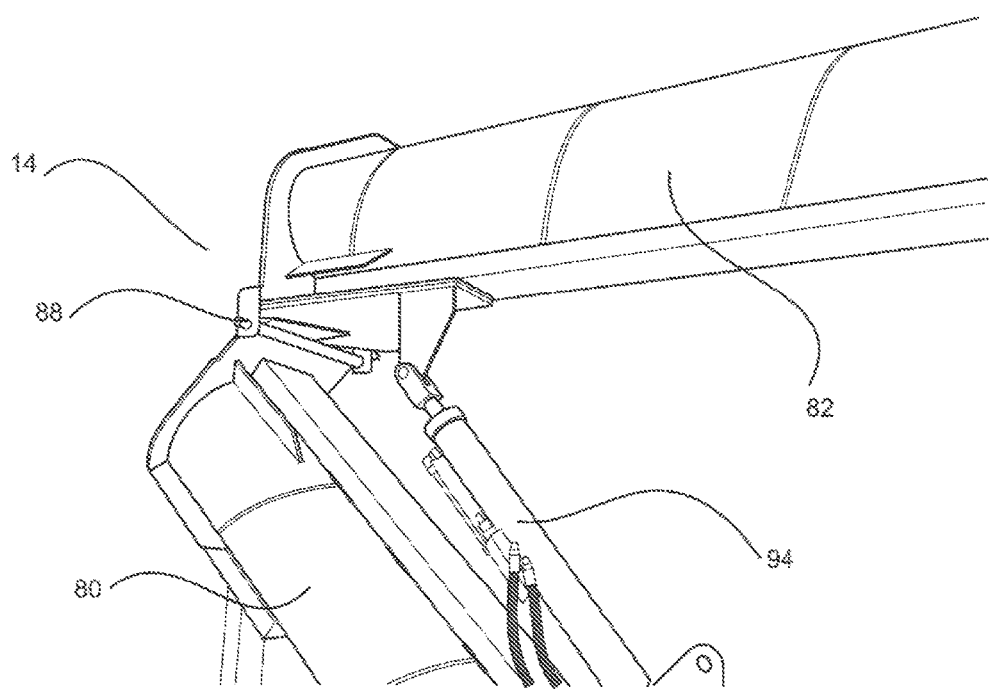
FIG. 18 is a partial view of the discharge unit shown in FIG. 17.

Referring to FIG. 18, the tubular body 86 of the second section 82 of the discharging unit 14 is pivotally attached to the tubular body 84 via hinge means 88. Further, the discharging unit 14 comprises a third hydraulic cylinder 94. One end of the cylinder 94 is pivotally attached to the tubular body 82 and the other end of the third cylinder 94 is attached to the tubular body 84. Selective displacement of the third hydraulic cylinder 94 between a contracted condition and an extended condition permits selective displacement of the discharging unit 14 between a contracted condition (see FIG. 17) and an extended condition (see FIG. 21).

Furthermore, the first and second sections of the second auger 20 are adapted to be operatively connected to each other. For this coupling means 96 are provided for releasably coupling the first section and the second section of the second auger 20.

Figure 19:
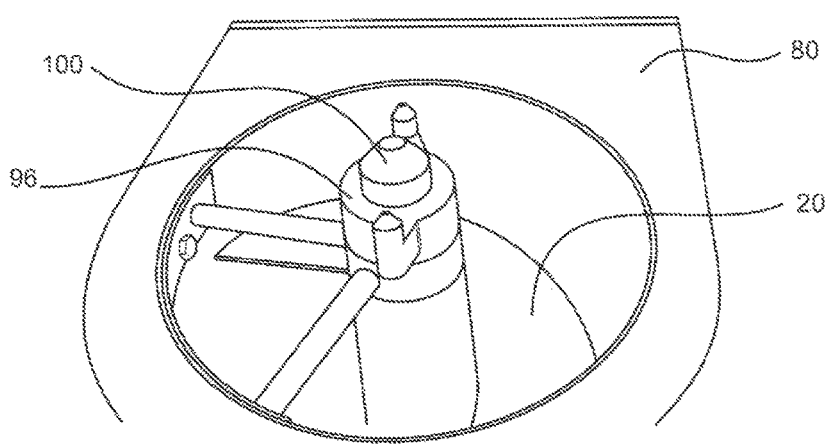
FIG. 19 is a top view of a section of the discharge unit shown in FIG. 17.
Figure 20:
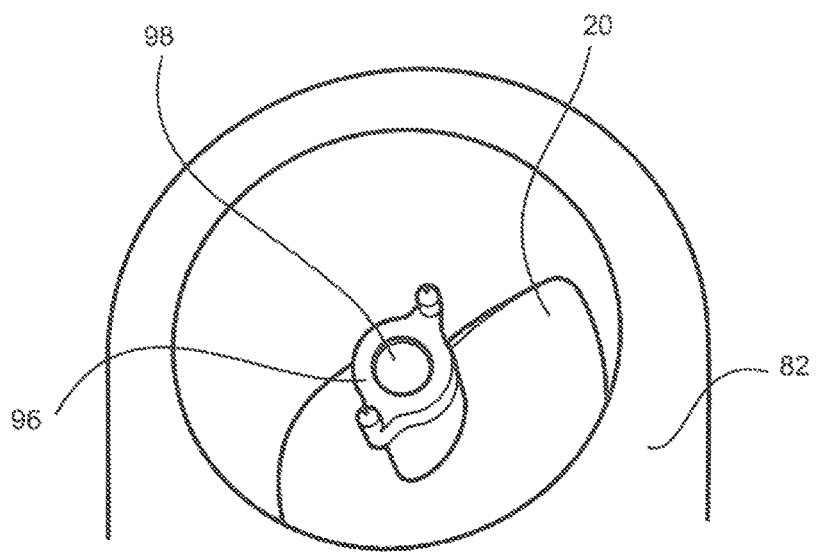
FIG. 20 is a top view of a section of the discharge unit shown in FIG. 17.

FIGS. 19 and 20 depict the coupling means 96. The coupling means 96 comprise a female portion 98 and a male portion 100 adapted to be received into the female portion 98 during coupling of the first and second sections of the second auger 20.

Figure 21:
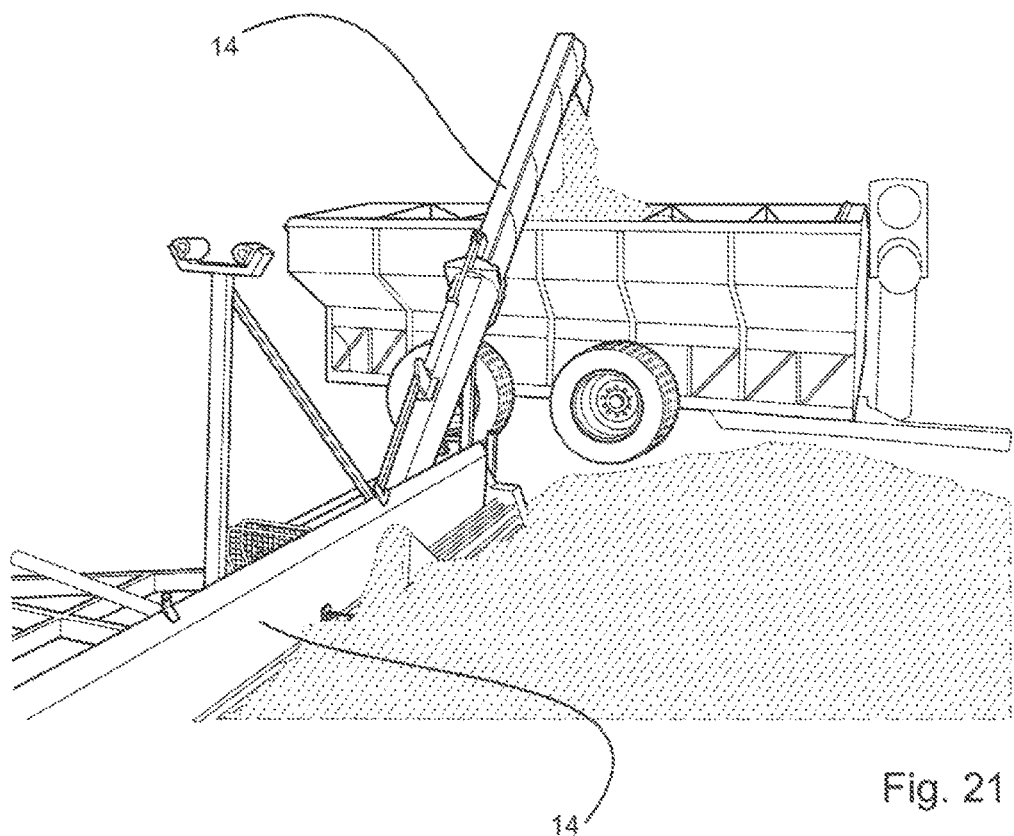
FIG. 21 is a side view of the material handling apparatus shown in FIG. 1 in operation.
Figure 22:
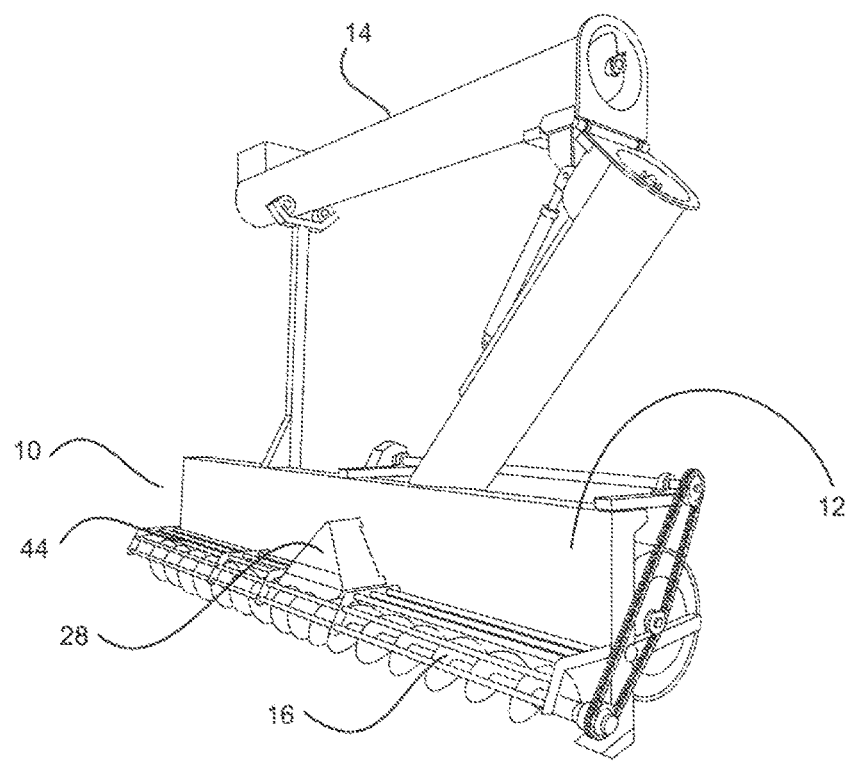
FIG. 22 is a perspective view of the material handling apparatus operatively connected to a driver in accordance with a second embodiment of the invention.
Figure 23:
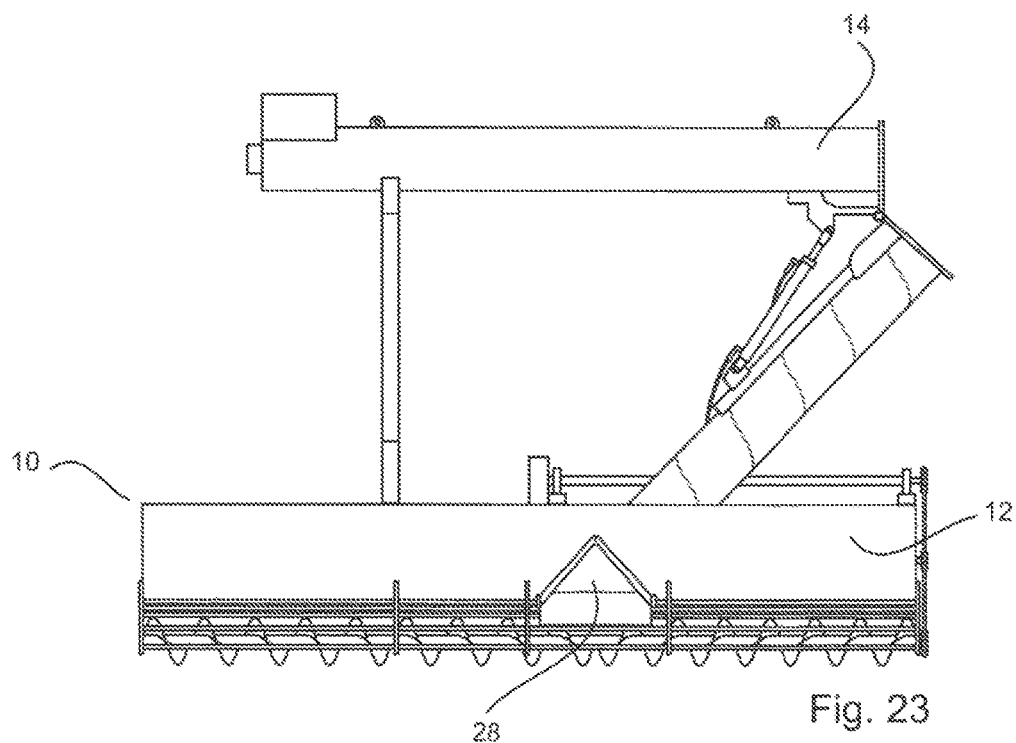
FIG. 23 is a front view of the material handling apparatus shown in FIG. 22.

Operatively attaching the first and second sections 80 and 82 of the second auger 20 permits transferring the rotational movement of the first section to the second section when the discharging unit 14 is in the extended condition and thus allowing the material to be conveyed through the discharging unit 14 to delivery into the tray of the waiting vehicle as is shown in FIG. 21.

Referring now to FIGS. 22 to 32.

FIGS. 22 to 32 show a material handling apparatus 10 according to a second embodiment of the invention. The apparatus according to the second embodiment is similar to the apparatus according to the apparatus of the first embodiment and similar reference numerals are used to identify similar parts.

The apparatus 10 according to the second embodiment of the invention when compared to the first embodiment of the invention does not include the jack wheels 56 that permit adjusting the distance between the support body 36 and the ground on which the grain rests.

Figure 24:
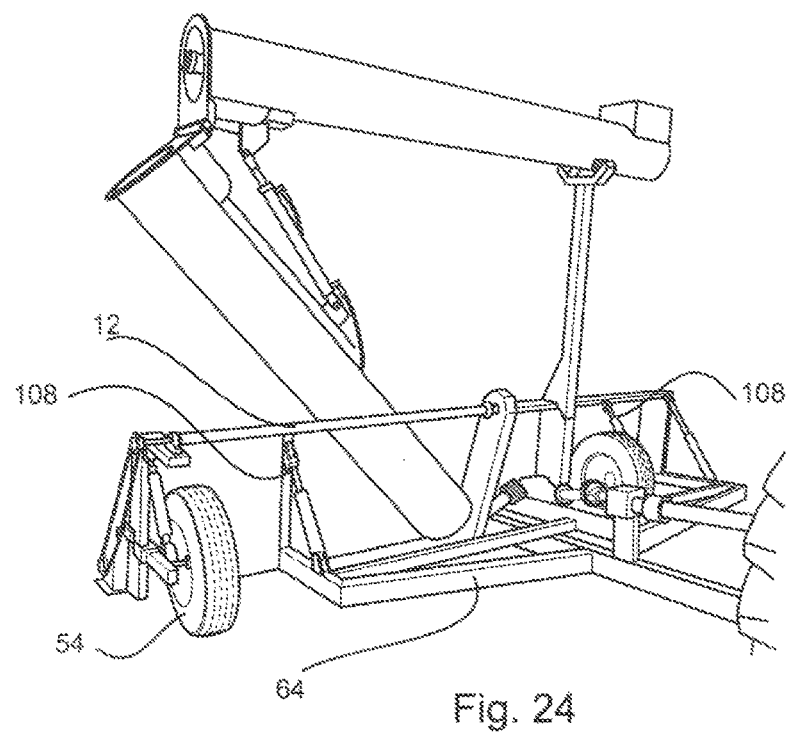
FIG. 24 is a rear view of the material handling apparatus shown in FIG. 22.

Referring to FIG. 24, in accordance with the second embodiment of the invention, there is provided on each side of the collecting unit 12 a first wheel 54; the wheels 54 may be adjusted independently with respect to each other. Each wheel 54 is pivotally attached to the rear of the collecting unit 12 permitting adjustment of the side to side leveling and tilting of the collecting unit 10. This can be best in the schematic FIG. 25.

Figure 25:
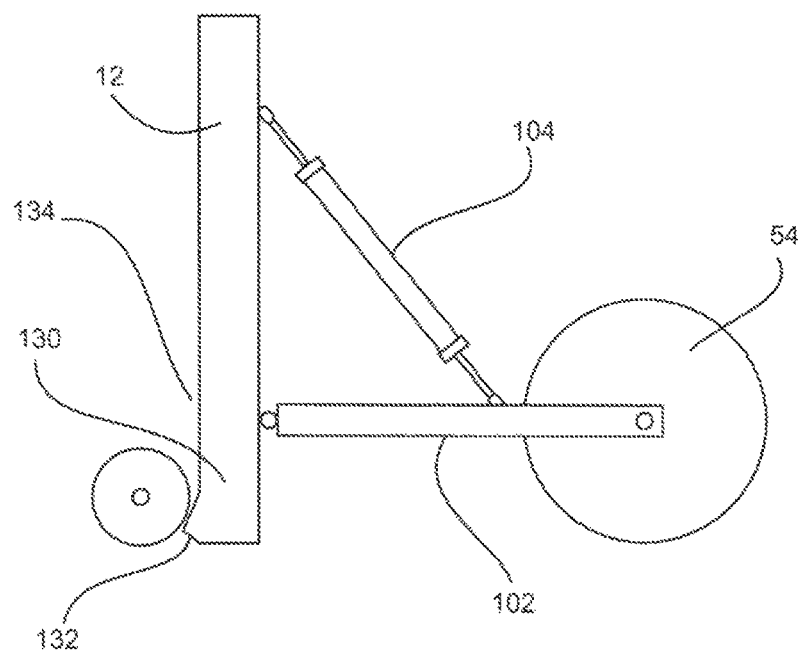
FIG. 25 is schematic diagram of the system for adjusting the distance between the collecting unit and the ground on which the pile of grain rests.
Figure 26:
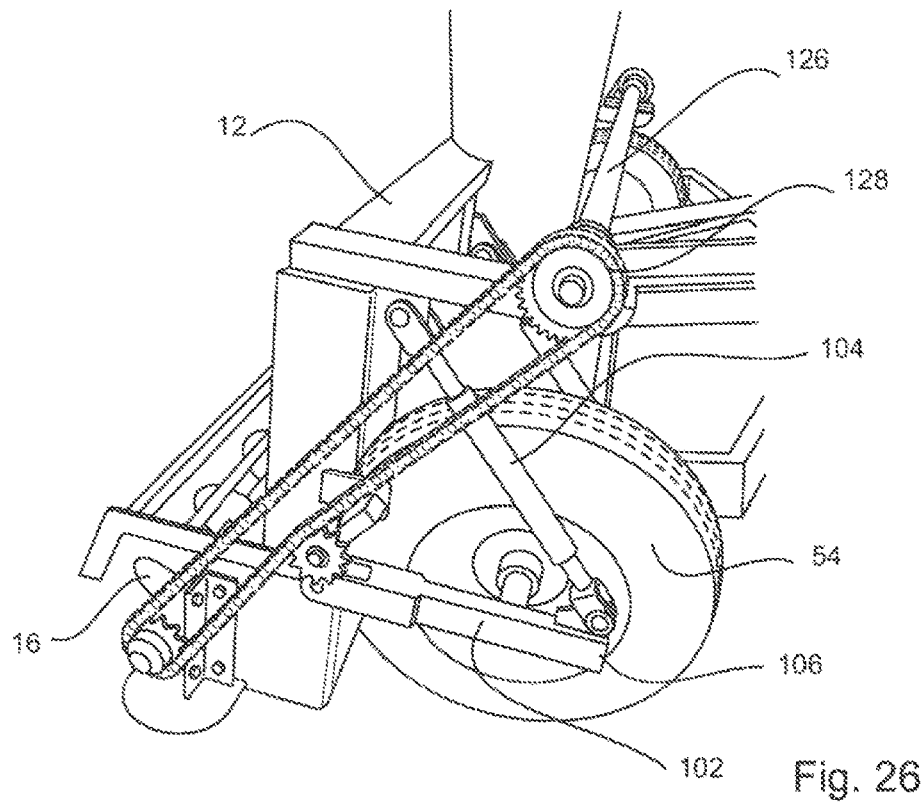
FIG. 26 is a detail of the side view of the material handling apparatus shown in FIG. 22.
Figure 27:
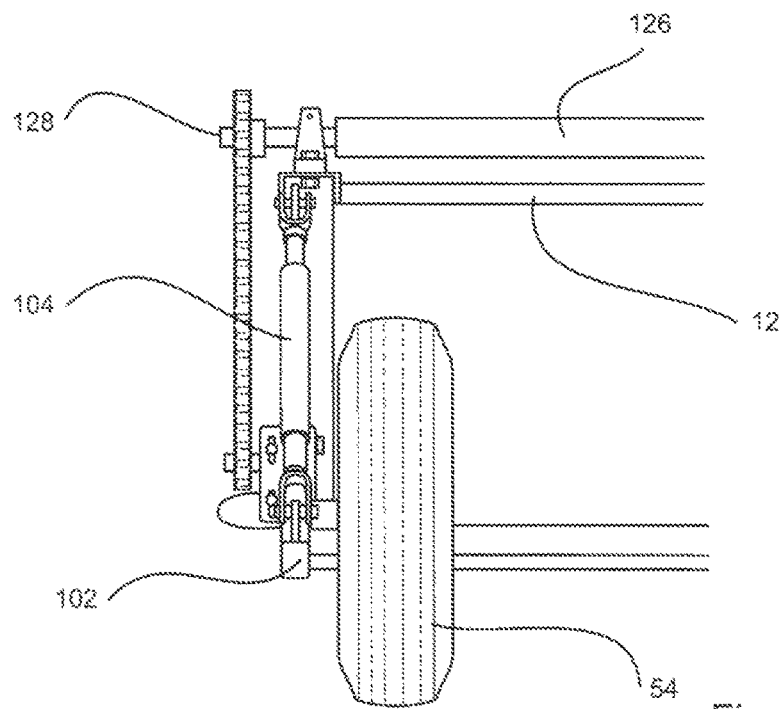
FIG. 27 is a detail of the rear view of the material handling apparatus shown in FIG. 24.
Figure 28:
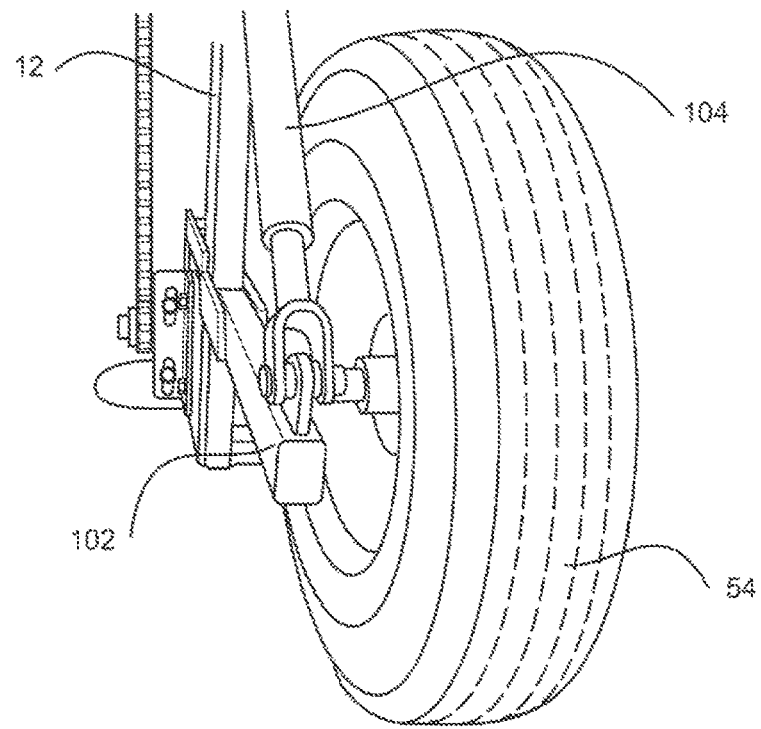
FIG. 28 is a close up view of a particular region of the detail shown in FIG. 27.
Figure 29:
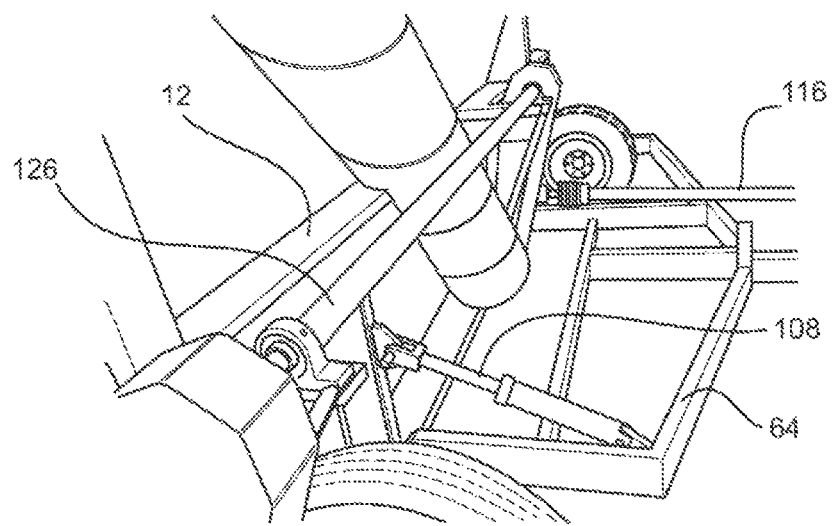
FIG. 29 is a side view of the material handling apparatus shown in FIG. 22.

As shown in FIG. 25, each wheel 54 is pivotally attached to the rear of the collecting unit via an support arm 102 attached to the rear face of the collecting unit via a pivot joint, and an adjustable coupling 104 (such as for example a screw type turnbuckle) extending from the rear wall (the second wall) of the collecting unit 12 to the support arm 104; in particular, an end of the coupling 104 is attached to a location above the pivot joint of the support arm 10 and the rear wall of the collecting unit and another end is attached to the support arm 104 at a particular location (for example, the distal end 106 of the support arm 102) of the support arm 102 to permit varying the angle formed between the arm member 102 and the rear wall of the collecting unit 12. Leveling and tilting of the collecting unit 12 is accomplished by either increasing or decreasing the angle formed between the arm member 102 and the rear wall of the collecting unit 12.

Furthermore, the apparatus 10 is adapted to permit tilting the collecting unit 12. For this the apparatus comprises a pair of hydraulic cylinders 108 spaced apart with respect to each other and each cylinder 108 is located adjacent one of the sides of the collecting unit. One end of each cylinder 108 is attached to the collecting unit 12, and the other end is attached to the hitch frame 64 that connects the collecting unit 12 to the tractor towing the apparatus 10. When the cylinders are retracted, the collecting unit 12 tilts forwards which thereby has the effect of raising the auger 16 from the ground.

Figure 30:
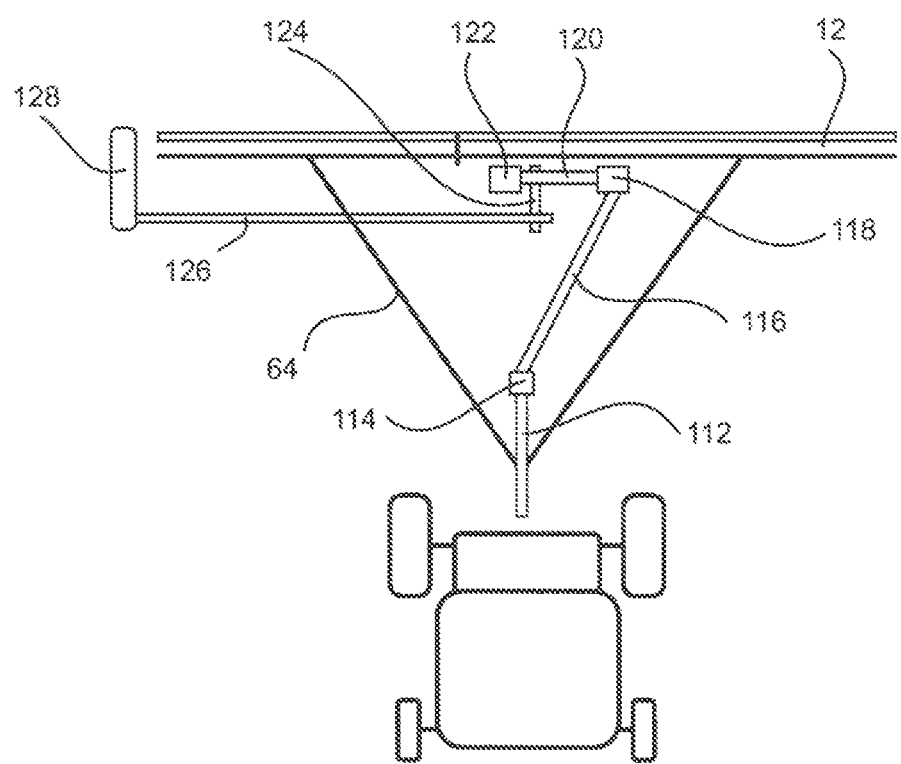
FIG. 30 is schematic diagram of the drive train of the material handling apparatus shown in FIG. 22.
Figure 31:
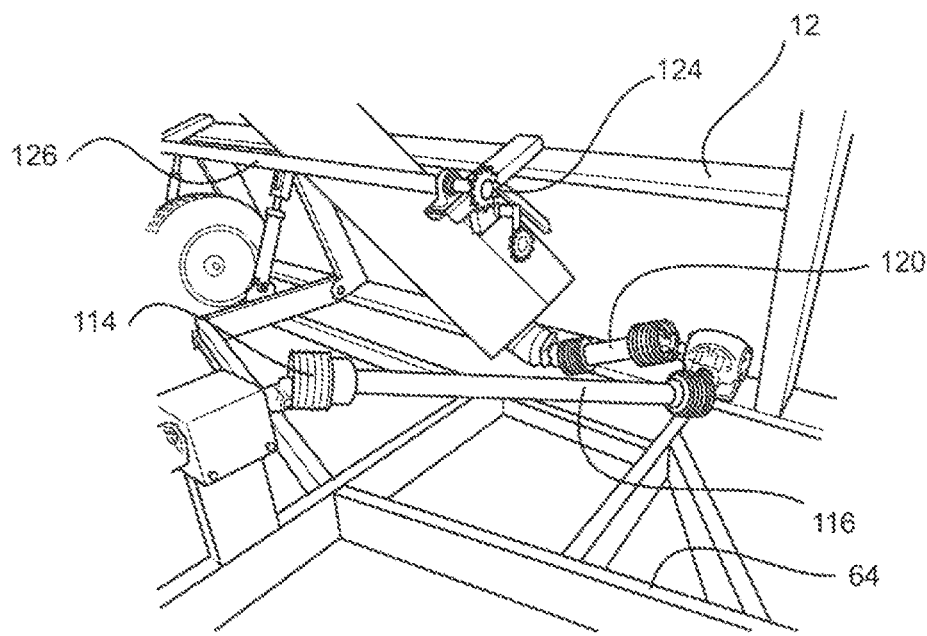
FIG. 31 is a detail of the rear view of the material handling apparatus shown in FIG. 24.
Figure 32:
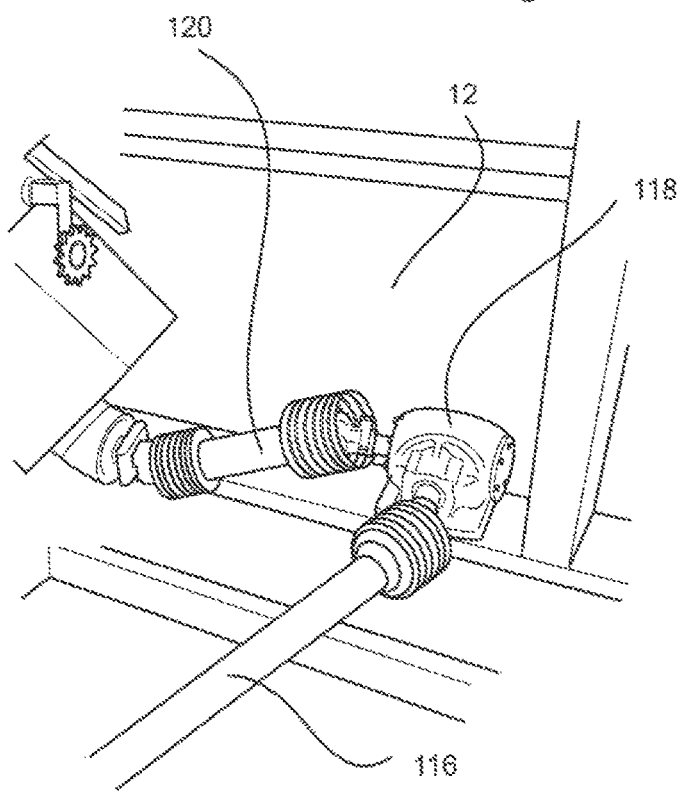
FIG. 32 is a close up view of a particular region of the detail shown in FIG. 31.

Moreover, the apparatus 10 in accordance with the second embodiment of the invention comprises a drive train 110 for operatively connecting the apparatus 10 to the power take off (PTO) of the tractor—see FIG. 30. The particular drive train 110 depicted in FIG. 30 is being directly driven from a single PTO shaft without the need for hydraulic power for rotating parts; this is particularly advantageous because it is a simpler and more positive drive system when compared to conventional drive systems, as well as being capable of transferring higher loads which allows the use of larger augers permitting increasing the capacity of collection and delivery of the apparatus 10 in accordance with the second embodiment of the invention.

In a particular arrangement, the large capacity in achieved (1) by the use of larger auger sizes (the first auger 16 flighting has 280 mm diameter, the second auger 20 flighting has 380 mm diameter) and (2) due to the effect of the force feed chamber in efficiently transitioning the grain from horizontal movement to vertical movement.

The schematic FIG. 30 shows the drive train 110 in accordance with the second embodiment of the invention.

As shown in FIG. 30, the drive train comprises a PTO shaft 112 extending from the tractor to a centre support bearing 114. The PTO shaft 112 may comprise a shear pin for overload protection.

Further, a first coupling shaft 116 extends from the support bearing 114 to the 90 degree gearbox 118 and a second coupling shaft 120 extends from the 90 degree gearbox 118 to a 45 degree gearbox 122 operatively connected to transmit the rotational force of the PTO to the base of the second auger 20.

Furthermore, a first sprocket attached to the second coupling shaft 120 having a chain 124 transfers the rotational force of the PTO to a second sprocket operatively attached to a third coupling shaft 126 that transfers the rotational force of the PTO to one of the ends of the first auger 16 via a sprocket and chain assembly 128 attached to the third coupling shaft 126.

In operation, the operator of the apparatus is stationed in the cabin of the towing vehicle (such as a tractor) while the apparatus 10 is operating. Initially, the operator engages the tractor PTO clutch. Subsequently, the operator lowers the apparatus 10 to the correct height by tiling the support body 36 via second hydraulic cylinders 62 using the tractor hydraulic control. Fine levelling of the apparatus 10 is performed by adjusting the adjusting links on the wheels 54 as mentioned above In a particular arrangement, the collecting unit 12 may be lowered using the hydraulic cylinders 108 until the base of the collecting unit 12 touches the surface of the pile of grain, while maintaining some weight on the wheels. As shown in FIG. 25, the base 130 of the collecting unit 10 comprises tapered leading edge 132. It is particularly advantageous the incorporation of the tapered leading edge 132 because as the apparatus 10 is moving into the pile of grain it emulates the effect of a sled. The grain is thereby pushed by the vertical face 134 (the first face) of the collecting unit 12 into the auger 16 flighting, and in the effect of sliding along the floor, the sled effect effectively reduces substantially any wastage, while sharing the weight of the apparatus 10 over a large surface area. This is in turn avoids sinking of the apparatus 10 into a soft surface which would result in the auger 16 collecting soil or the material that makes up floor of the bunker where the pile of grain is located.

Once, the collecting unit 12 is lowered onto the pile of grain, the operator reverses the tractor slowly towards the face of the material stack (such as a grain stack) until the rotating first auger 16 contacts the grain stack and delivers the grain inwards towards the feed chamber 28.

The operator continues to push the apparatus 10 backwards until such time as the discharge flow rate of grain is sufficient, or the engine of the tractor reaches the maximum acceptable load, whichever occurs first.

If the apparatus 10 is pushed too quickly into the face of the grain stack, the capacity of the second auger 20 to remove grain may be exceeded by the supply from the first auger 16. As mentioned before, the feed chamber 28 is adapted to allow any surplus supply of grain from the first auger 16 to spill out through the spacing 33 between the feed chamber 28 and opening 32 of the support body 36, thus avoiding damaging the apparatus 10 by overloading the discharging unit 14. In a particular arrangement of the apparatus 10 the capacity of the apparatus may be in excess of 6 tonnes of grain moved per minute of operation.

Furthermore, as mentioned earlier the apparatus 10 may be used for extracting grain stored in the silo bags that have been, for example, cut to permit the material handling apparatus 10 access to the grain for collection thereof. In a particular arrangement of the material handling apparatus 10, the material handling apparatus 10 comprises cutting means for cutting the silo bag. The cutting means are adapted and located at particular locations of the apparatus permitting that as the apparatus 10 travels along the silo bag, the silo bag is cut and the apparatus 10 may collect the grain within the silo bag. In an arrangement, the cutting means are attached to the cutting unit 12.

In particular arrangements, the collecting unit 12 may have a width of 4, 5 meters and 6 meters; however, the dimensions of the collecting unit 12 may be varied according to the particular applications and needs.

Modifications and variations as would be apparent to a skilled addressee are deemed to be within the scope of the present invention.

Further, it should be appreciated that the scope of the invention is not limited to the scope of the embodiments disclosed.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A collecting unit for a material handling apparatus, the collecting unit having a support body comprising:
    a chamber having an opening for delivering a material into the chamber from a first location exterior into the chamber;
    a first auger rotatably attached to the support body for collecting and delivering the material to the first location, the first auger comprising a portion at the first location exterior to the chamber for delivering the material into the chamber;
    a feeding chamber spaced apart from the opening defining a spacing between the opening and the feeding chamber to allow the material to spill out of the spacing during delivery of the material into the chamber; and
    the support body being adapted to receive a discharging unit having a second auger such that at least a portion of the second auger is located within the chamber for delivering the material from the chamber into the discharging unit for conveying the material via the second auger to a second location.

2. A collecting unit according to claim 1 wherein the support body comprises a base having a tapered leading edge for emulating the effect of a sled.

3. A collecting unit according to claim 1 wherein the feeding chamber is adapted to receive the material delivered to the first location and to deflect the material into the chamber.

4. A collecting unit according to claim 1 wherein the first auger comprises a first section having a screw orientation that, during rotation of the first auger, delivers the material from the one end of the support body to the opening, and a second section having another screw orientation that, during rotation of the first auger, delivers the material from the opposite side of the support body to the opening.

5. A collecting unit according to claim 4 further comprising an interface between the first section and the second section of the first auger defining the portion of the first auger located at the first location exterior to the chamber.

6. A collecting unit according to claim 5 wherein the portion of the first auger comprises a paddle assembly adjacent to the opening, the paddle assembly being adapted for delivering into the chamber material conveyed to the first location.

7. A collecting unit according to claim 6 wherein the paddle assembly is adapted to throw the material towards an inner surface of the feeding chamber for deflection of the material into the chamber.

8. A collecting unit according to claim 1 wherein the support body comprises a front face having the opening and the first auger attached thereto, and a rear face adapted to receive a hitch frame for operation of the collecting unit.

9. A collecting unit according to claim 8 wherein the first auger extends lengthways along the front face.

10. A collecting unit according to claim 9 wherein the support body further comprises a frame covering the first auger, the frame extends outwardly from the front face and lengthways along the front face.

11. A collecting unit according to claim 10 wherein the frame defines a cage structure adapted to receive the material spilling out of the spacing during operation of the collecting unit.

12. A collecting unit according to claim 10 wherein the frame comprises one side attached to the front face and an opposite side spaced apart from the front face.

13. A collecting unit according to claim 12 wherein the feeding chamber is attached to the opposite side of the frame.

14. A material handling apparatus for conveying a material stacked at a first location to a second location, the apparatus comprising a collecting unit having a support body comprising:
    a chamber having an opening for delivering the material into the chamber from the first location exterior to the support body;
    a first auger rotatably attached to the support body for collecting and delivering the material to the first location, the first auger comprising a portion at the first location exterior to the chamber for delivering the material into the chamber;
    a feeding chamber spaced apart from the opening defining a spacing between the opening and the feeding chamber to allow the material to spill out of the spacing during the delivering of the material into the chamber; and
    the support body being adapted to receive a discharging unit having a second auger such that at least a portion of the second auger is located within the chamber for delivering the material from the chamber into the discharging unit for conveying the material via the second auger to the second location.

15. An apparatus according to claim 14 wherein the apparatus further comprises first wheels for moving the apparatus and adjusting the height of the support body of the collecting unit, and wherein each first wheel is pivotally attached to the second face of the collecting unit via a support arm and an adjustable coupling extending from the second face of the collecting unit to a particular location of the support arm for adjusting the orientation of the support body.

16. An apparatus according to claim 14 further comprising jack wheels attached to each side of the support body to adjust the height of the support body of the collecting unit.

17. An apparatus according to claim 16 wherein the left and right jack wheels are adapted to mechanically adjust the height independently with respect to each other at each side of the collecting unit.

18. An apparatus according to claim 14 wherein the apparatus is adapted to be operatively attached to drive means and hydraulic fluid sources of a towing vehicle.

19. An apparatus according to claim 14 wherein the discharging unit for delivering the collected grain to the second location comprises first and second sections, the second section being pivotally attached to the first section permitting to selective displacement of the discharging unit between a collapsed condition and an erected condition.

20. An apparatus according to claim 14 further comprising cutting means for cutting silo bags containing grain to allow access of the apparatus to the grain stored within the silo bag, wherein the cutting means are adapted and located at particular locations of the apparatus permitting that as the apparatus travels along the silo bag, the silo bag is cut and the apparatus may collect the grain within the silo bag.

21. A apparatus according to claim 14 wherein the support body comprises a front face having the opening and the first auger attached thereto, and a rear face adapted to receive a hitch frame for operation of the collecting unit.

22. An apparatus according to claim 21 wherein:
each first wheel is pivotally attached to the rear face of the support body via a support arm and an adjustable coupling extending from the rear face of the support body to a particular location of the support arm; and
the support arm is attached to the rear face of the support body via a pivot joint and wherein an end of the coupling is attached to the rear face of the support body at a location above the pivot joint and another end is attached to a particular location of the support arm.

23. An apparatus according to claim 21 wherein the support body of the collecting unit is adapted to be tilted for adjusting the height and angle of the first auger with respect to the ground.

24. An apparatus according to claim 23 wherein the apparatus comprises a pair of hydraulic cylinders spaced apart with respect to each other and each cylinder is located adjacent one of the sides of the collecting unit.

25. An apparatus according to claim 24 wherein an end of each cylinder is attached to the rear face of the support body, and the other end is attached to a hitch frame of the apparatus for connecting the collecting unit to the towing vehicle.

\* \* \* \* \*